United States Patent [19]

Tessler

[11] Patent Number: 4,867,413
[45] Date of Patent: Sep. 19, 1989

[54] GASKETLESS VALVE, AND METHODS OF CONSTRUCTING AND UTILIZING SAME

[76] Inventor: Edward Tessler, 23 Milton Ave., Monticello, N.Y. 12701

[21] Appl. No.: 218,868

[22] Filed: Jul. 14, 1988

[51] Int. Cl.$^4$ ............................................. F16K 3/08
[52] U.S. Cl. ................................... 251/304; 251/314; 137/625.46
[58] Field of Search ................... 137/625.46; 251/904, 251/304, 314

[56] References Cited

U.S. PATENT DOCUMENTS

| | | | |
|---|---|---|---|
| 2,854,027 | 9/1958 | Kaiser et al. | 251/904 X |
| 3,026,899 | 3/1962 | Mischanski | 251/304 X |
| 3,314,644 | 4/1967 | Dwyer et al. | 251/314 X |
| 3,874,413 | 4/1975 | Valdez | 137/625.47 |
| 3,962,089 | 6/1976 | Fulkuawa | 210/191 |
| 4,210,538 | 7/1980 | Tantillo et al. | 210/333 A |
| 4,545,408 | 10/1985 | Sonneborn | 137/625.46 |
| 4,632,150 | 12/1986 | Gagas | 137/625.46 |
| 4,652,369 | 3/1987 | DePolo | 210/169 |
| 4,676,914 | 6/1987 | Mills et al. | 210/741 |

*Primary Examiner*—Arnold Rosenthal
*Attorney, Agent, or Firm*—Irving M. Weiner; Joseph P. Carrier; Robert M. Petrik

[57] ABSTRACT

A gasketless seal is provided for fluid-tightly containing a pressurized fluid. The seal comprises a projection extending integrally from a first surface, a groove formed into a second surface and adapted to receive and fluid-tightly, sealingly engage the projection when the first and second surfaces are engaged, and a method for connecting the first and second surfaces together in an engaged relation. The first and second surfaces are constructed of molded plastic, and the groove is tapered so as to narrow inwardly of the second surface.

6 Claims, 1 Drawing Sheet

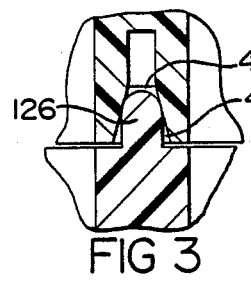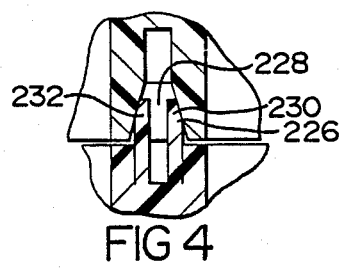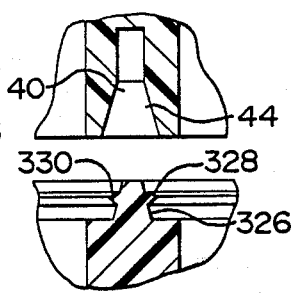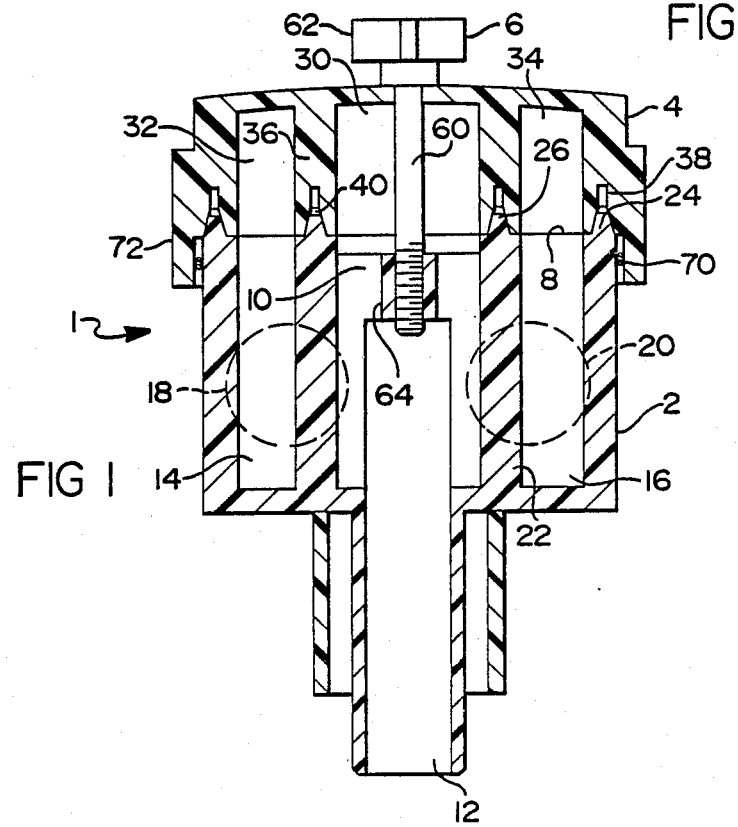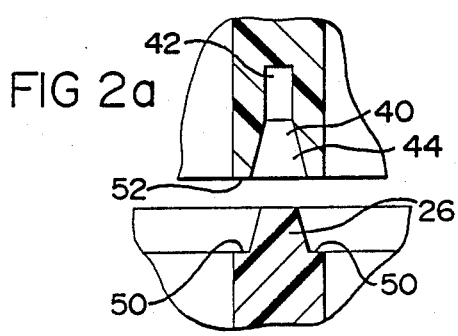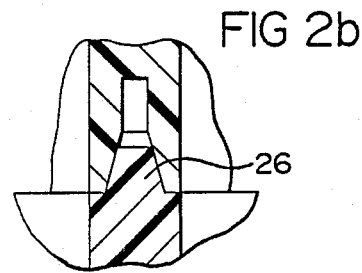

GASKETLESS VALVE, AND METHODS OF CONSTRUCTING AND UTILIZING SAME

BACKGROUND OF THE INVENTION

1. Field of the Invention

The present invention pertains to a gasketless seal, and the use of such a seal in a gasketless valve. More particularly, the present invention pertains to a gasketless seal capable of containing a highly pressurized fluid, and an improved, simple valve which utilizes the gasketless seal.

2 Description of the Relevant Art

There are known gasketless sealing arrangements and gasketless valves. For example, U.S. Pat. No. 4,632,150 discloses a gasketless rotary valve for a water conditioner. The valve disclosed in the patent is formed of plastic, and comprises a valve seat having a plurality of raised ribs on both sides thereof and sandwiched between planar surfaces of a housing plate member and a rotor assembly plate member, respectively. The valve housing, the valve seat and the rotor assembly are secured tightly together using a plurality of fasteners, such as nuts and bolts.

Although the valve disclosed in the above discussed patent functions effectively, it is relatively complex and the seal achieved between the rotor assembly and the valve housing is prone to leakage, especially if the fasteners are not tightly engaged.

The present invention has been developed to overcome the disadvantages of known gasketless sealing arrangements, particularly known gasketless valves.

SUMMARY OF THE INVENTION

According to the present invention there is provided a gasketless seal for fluid-tightly containing a pressurized fluid, comprising a projection extending integrally from a first surface, a groove formed into a second surface and adapted to receive and fluid-tightly, sealingly engage the projection when the first and second surfaces are engaged, and means for connecting the first and second surfaces together in an engaged relation. The groove is tapered so as to narrow inwardly of the second surface.

According to the present invention there is also provided a gasketless valve, comprising a valve body having an opening defined in a surface thereof, and a rotor secured to the valve body and fitted in the opening of the valve body such that a surface of the rotor engages a surface of the valve body. Either the valve body surface or the rotor surface has a projection formed integrally thereon in surrounding relation to the opening defined in the valve body surface, while the other of the valve body surface and the rotor surface has a groove formed therein which receives and fluid-tightly, sealingly engages the projection. The groove is tapered so as to narrow inwardly o the surface it is formed in.

It is an object of the present invention to provide a simple gasketless seal capable of effectively containing a highly pressurized fluid.

It is another object of the present invention to provide such a seal which can be easily and economically constructed of moldable materials, such as plastics, and yet is quite durable and highly reliable.

Yet another object of the present invention is the provision of a simple valve incorporating such a gasketless seal.

Other objects, advantages and salient features of the present invention will become apparent from the following detailed description which, when taken into conjunction with the annexed drawings, discloses preferred embodiments of the present. invention.

BRIEF DESCRIPTION OF THE DRAWINGS

FIG. 1 is a sectional view of a gasketless rotary valve having a seal according to a first embodiment of the present invention.

FIGS. 2a and 2b are enlarged sectional views of the seal of FIG. 1 in a disengaged position and an engaged position, respectively.

FIG. 3-5 are enlarged sectional views of seals according to second, third and fourth embodiments of the present invention, respectively.

DETAILED DESCRIPTION OF THE PREFERRED EMBODIMENTS

Referring to FIG. 1, a gasketless rotary valve including a seal according to a first embodiment of the present invention is generally indicated at 1. It will be understood that the particular construction of the valve 1, other than the seal, is not critical to the present invention and is being presented only for a clear understanding of the invention. A seal according to the present invention could be used in any desired valve or other structure that requires a fluid-tight seal between two surfaces, such as a pump, a reaction vessel, etc.

Valve 1 generally includes a valve body 2, a rotor 4 which also functions as a cover for the valve body 2, and a connecting means 6 which connects the valve body 2 and the rotor 4 tightly together. As depicted, the valve 1 is substantially identical to a valve disclosed in U.S. Pat. 3,721,268 except that the patented valve includes a unitary, resilient seal ring interposed between the body 2 and the rotor 4 instead of the novel seal according to the present invention. The complete disclosure of the aforementioned patent is incorporated herein by reference thereto.

The valve body 2 is constructed as a generally cylindrical member having an upper opening 8, a central chamber 10 communicating with a fluid inlet 12, and a plurality of separate, outer chambers 14, 16 communicating with outlets 18, 20, respectively. The chambers 10, 14, 16 are separated by an appropriately shaped median 22.

Further, according to the novel aspects of the present invention, the valve body 2 includes a first projection or ridge 24 defined on an upper surface of a peripheral portion thereof in surrounding relation to the upper opening 8, and a second projection or ridge 26 formed integrally on an upper surface of the median 22 in surrounding relation to each of the chambers 10, 14, 16. As depicted, the projections 24, 26 are preferably tapered outwardly of the valve body when viewed in section.

The rotor 4 includes a central chamber 30 which communicates with the central chamber 10 of the valve body 2, and a plurality of fluid chambers 32, 34 which communicate with the fluid chambers 14, 16 in the valve body 2.

The chambers 30, 32, 34 are separated by an appropriately shaped median 36 of the rotor. Additionally, according to conventional practices, the median 36 would have an opening (not shown) formed in one portion thereof to define a fluid communication channel between the central chamber 30 and one of the outer fluid chambers 32, 34.

Through such construction, the rotor 4 can be selectively rotated and positioned relative to the valve body 2 such that the fluid communication channel in the rotor communicates with a desired one of the outer fluid chambers 14, 16 in the valve body, and whereby fluid entering the inlet 12 in the valve body 2 can be selectively discharged through a desired one of the outlets 18, 20 corresponding to the outer fluid chambers 14, 16, respectively.

Further, according to the novel aspects of the present invention, the rotor has a groove 38 defined in a lower surface of a peripheral portion thereof and a groove 40 defined in a lower surface of the median 36. The grooves 38, 40 have substantially the same configuration as the projections 24, 26 of the valve body 2, and are adapted to receive and sealingly engage the projections 24, 26 when the rotor 4 is secured to the valve body 2 using the connecting means 6. The grooves 38, 40 function as sealing seats for the projections 24, 26.

It will be understood that because FIG. 1 is a sectional view, unshown halves of the valve body 2 and rotor 4 could include additional outer fluid chambers in symmetric relation to the chambers 14, 16, 32, 34 as shown.

As depicted, the grooves 38, 40 are preferably Y-shaped when viewed in section, including an inner stem portion 42 and an outer cone-shaped portion 44 which is tapered so as to narrow inwardly of the rotor 4 towards the stem 42. This novel Y-shape of the grooves 38, 40 is quite advantageous because it permits the grooves to achieve a spring fit relative to the projections 24, 26 and thereby assure an excellent seal. Particularly, the stem portions of the grooves 38, 40 permit the cone-shaped portions 44 to flex outwardly when the projections 24, 26 are tightly engaged with the cone-shaped portions 44 by the connecting means 6.

As depicted, the cone-shaped portions 44 of the grooves 38, 40 are preferably shaped to correspond to the tapered projections 24, 26, respectively, of the valve body 2. It is also preferred, but not necessary, that the width of the projections 24, 26 will be slightly larger than the corresponding width of the cone-shaped portion 44 of the grooves 38, 40. This feature is also desirable, again because it helps to assure an excellent fluid seal between the projections 24, 26 and the grooves 38, 40.

The base portions of the projections 24, 26 preferably have a smaller width than the corresponding valve body surfaces from which they project to thereby define shoulders 50. The shoulders 50 act as stops for corresponding surfaces 52 of the rotor 4 which will be engaged therewith.

The valve body 2 and the rotor 4 are preferably constructed of moldable materials, such as plastics, but could be constructed of any other appropriate materials, including metals.

For example, in one preferred embodiment, each of the valve body 2 and the rotor 4 are molded as a single, unitary member from a single, appropriate rigid plastic. In another preferred embodiment, each of the valve body 2 and the rotor 4 are molded with a plurality of different plastics such that the main portions of the body and rotor comprise a suitable rigid plastic(s), while the sealing portions of the body and rotor would comprise a more suitable, softer plastic(s). In still another embodiment one of the valve body 2 and rotor 4 could be molded of a rigid plastic, while the other could be molded of a softer plastic. These examples are not meant to limit the invention in any way. Rather, it will be understood that any desired material or combination of materials can be used which will achieve an efficient seal.

As will also be understood, the complete valve can be simply and economically constructed because the novel seal thereof is constructed integrally with the valve body 2 and the rotor 4, thereby reducing initial manufacturing costs, as well as assembly costs. Moreover, a valve according to the present invention is quite durable and reliable.

The connecting means 6 as depicted includes a threaded screw member 60 which extends through an opening formed in an upper central portion of the rotor 4 and is screwed into a threaded receiver member 64 formed integrally with the valve body 2 according to conventional practices. The threaded screw member 60 has a knob 62 formed on an upper end thereof which can be manipulated by an operator to permit the rotor 4 to be selectively disengaged from the valve body 2, rotated into desired positions and re-engaged to the valve body, as discussed above. It will be understood that any other appropriate 15 connecting means, such as clips or bolts, could alternatively be used as the connecting means 6.

An O-ring 70 or other appropriate sealing means may be provided between an overlapping portion 72 of the rotor 4 and an outer surface of the valve body 2 to prevent foreign matter from entering therebetween.

Referring to FIGS. 3-5, there is shown second, third and fourth embodiments of the present invention, respectively. These embodiments differ from the first embodiment of the present invention, as shown in FIGS. 1-3, only in the particular shape of the sealing projections. In reference to FIG. 3, the sealing projection 126 is rectangularly shaped with a semicircular or rounded outermost end when viewed in section. The projection 126 functions in substantially the same manner as the tapered projections 26 according to the first embodiments of the invention in that the semicircular end of the projection 126 tightly, sealingly fits against the tapered, cone-shaped portion 44 of the groove 40.

Referring to FIG. 4, the projection 226 according to the third embodiment of the present invention differs from the projection 26 primarily in that the projection 226 has a central opening 228 formed therethrough such that the projection 226 is actually a pair of projection legs 230, 232.

This novel construction achieves a double spring action seal between the projection 226 and a corresponding groove 38 or 40 when these two components are engaged together. Particularly, the Y-shaped groove 38 or 40 springs outwardly, as discussed above, while the projection legs 230, 232 are permitted to spring inwardly towards each other because of the central opening 228.

As depicted, the central opening 228 may preferably extend not only through the projection 226, but also into the material below the projection 226. Such elongated opening enhances the spring action of the projection legs 230, 232. As also depicted, each of the projections 230, 232 is preferably constructed to be substantially rectangular when viewed in section, except for an upper portion thereof which is tapered at an angle substantially the same as the angle of the cone-shaped portion 44 of the groove 40. Similar to the first embodiment, the width of the projection 226 may be slightly greater than the corresponding width of the cone-shaped portion 44 of the groove 38 or 40, to thereby improve the fluid-tightness of the seal therebetween.

Referring to FIG. 5, a projection 326 according to a fourth embodiment of the invention is substantially similar to the projection 26 according to the first embodiment, except that the projection 326 includes a pair of transversely extending lips formed on opposite, intermediate portions of the projection 326 as viewed in section. The lips 328, 330 engage corresponding inner surfaces of the cone-shaped portion 44 of a groove 38 or 40 when the projection 326 and the groove are connected together, to thereby improve the fluid tightness of the seal achieved between the projection 326 and the groove 40.

The lips 328, 330 can have a desired shape, including a cone shape as depicted, rounded, etc. Also, lips 328, 330 can be much smaller than depicted, and additional pairs of similar transversely-extending lips can be provided along the length of projection 326.

Although there has been described what are at present considered to be the preferred embodiments of the invention, it will be understood that the invention can be embodied in other specific forms without departing from the spirit or essential characteristics thereof. For example, it will be readily understood that sealing grooves could alternatively be formed into a valve body, while sealing projections could alternatively be formed on a valve rotor. The present embodiments are, therefore, to be considered in all aspects as illustrative, and not restrictive. The scope of the invention is indicated by the appended claims rather than the foregoing description.

I claim:

1. A gasketless valve, comprising:
   a valve body having an opening defined in a surface thereof; and
   a rotor secured to said valve body and fitted in the opening of said valve body such that a surface of the rotor engages the surface of the said valve body;
   one of said valve body surface and said rotor surface has a projection formed integrally thereon in surrounding relation to the opening defined in the valve body surface; and
   the other of said valve body surface and said rotor surface has a groove formed therein, said groove being Y-shaped in section and tapering so as to narrow inwardly of the member into which it is formed, the groove receiving and fluid-tightly, sealingly engaging the projection.

2. A valve according to claim 1, wherein:
   said projection is tapered so as to narrow outwardly of the member on which it is formed, and a width of said projection is slightly larger than a corresponding width of said groove.

3. A valve according to claim 2, wherein:
   each of said valve body and said rotor constructed of molded plastic; and
   said valve body surface and said rotor surface are substantially planar.

4. A valve according to claim 2, wherein: said projection has a central opening defined therethrough and said projection including a pair of legs spaced apart by the central opening.

5. A valve according to claim 1, wherein:
   an outermost portion of said projection is rounded.

6. A valve according to claim 1, wherein:
   said projection has at least one pair of transversely-extending lips formed on opposite intermediate portions thereof.

* * * * *

UNITED STATES PATENT AND TRADEMARK OFFICE
CERTIFICATE OF CORRECTION

PATENT NO. : 4,867,413

DATED : September 19, 1989

INVENTOR(S) : Edward TESSLER

It is certified that error appears in the above-identified patent and that said Letters Patent is hereby corrected as shown below:

Column 1, line 58, change "o" to --of--.

Column 4, line 23, delete "15".

Column 6, line 5 (claim 1, line 6), after "surface of" delete "the".
Column 6, line 22 (claim 3, line 2), after "rotor" insert--is--.

Signed and Sealed this

Eleventh Day of December, 1990

Attest:

HARRY F. MANBECK, JR.

Attesting Officer

Commissioner of Patents and Trademarks